Patented Aug. 24, 1943

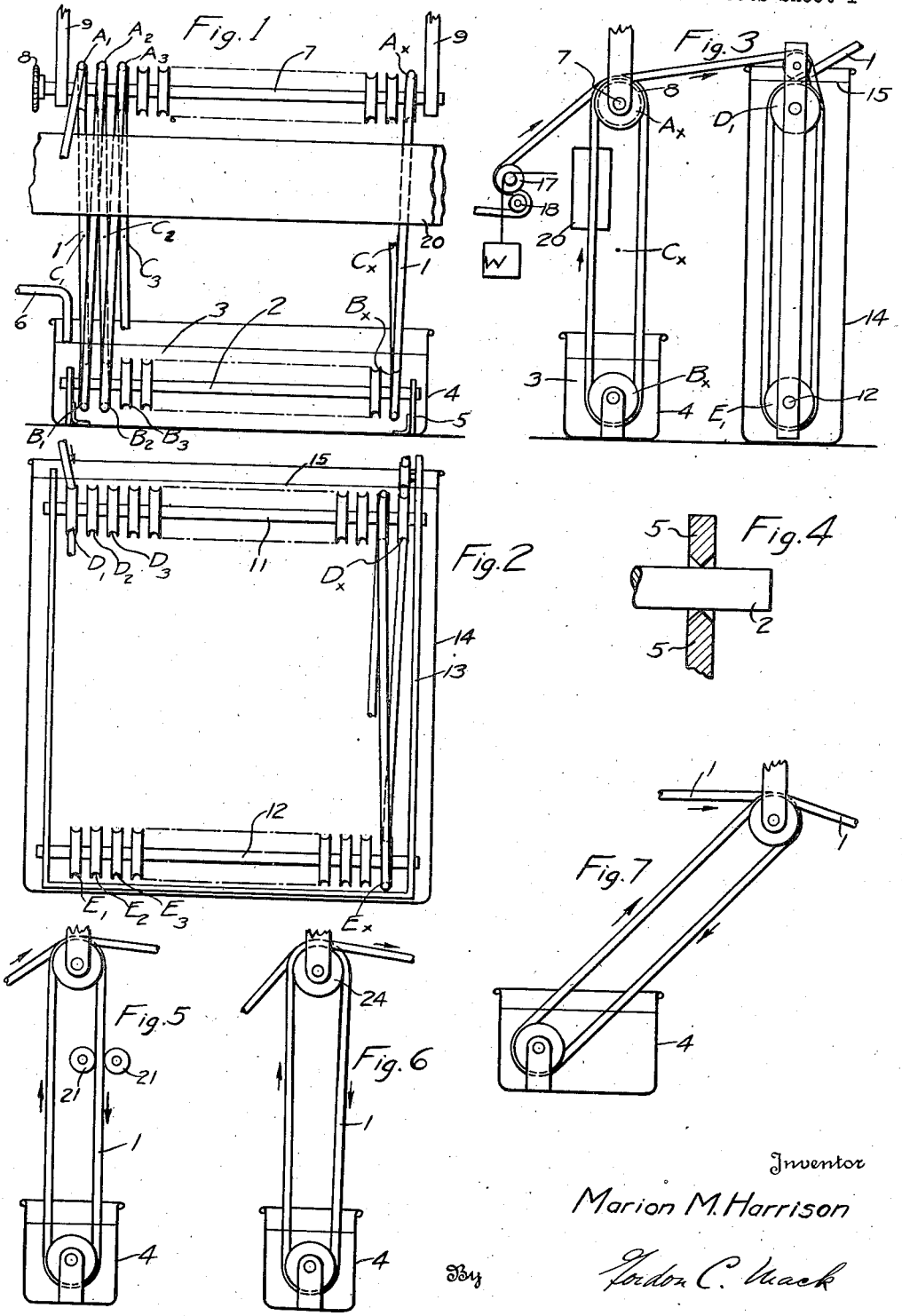

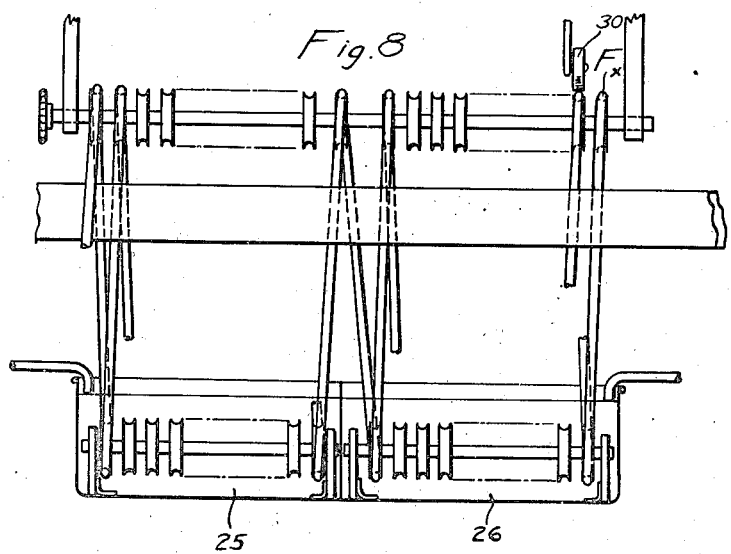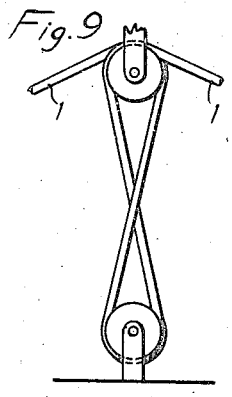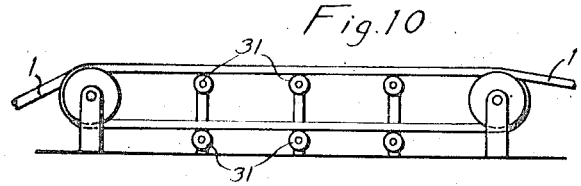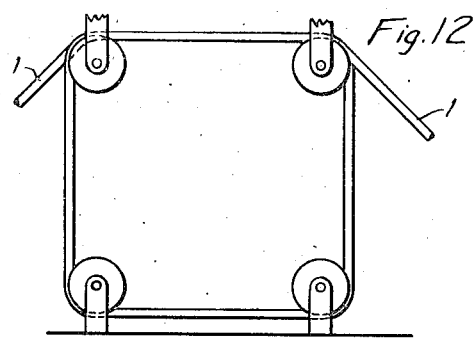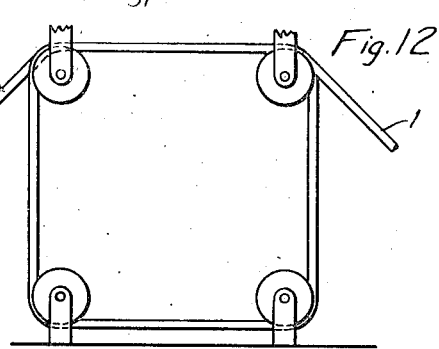

2,327,638

UNITED STATES PATENT OFFICE 2,327,638

MANUFACTURE OF RUBBER PRODUCTS AND APPARATUS THEREFOR

Marion M. Harrison, Peninsula, Ohio, assignor to Harrison & Morton Laboratories, Inc., Akron, Ohio, a corporation of Ohio Application September 7, 1940, Serial No. 355,779

20 Claims. (Cl. 18—24)

This invention relates to the manufacture of products from rubber or the like. In its preferred form the invention relates to process and apparatus for the continuous production of rubber tubing or the like from latex. A flexible, elastic base or mandrel is stretched by being subjected to mechanical tension, and while being maintained in a stretched condition, and without treatment by a coagulant is caused to pass thru a plurality of continuous and successive cycles, each cycle including the steps of: submergence into, and emergence from a latex bath, and drying, in the order named; and the product formed is then vulcanized while still on the mandrel and as a part of the continuous process of formation and vulcanization.

The manufacture of tubing from latex in a continuous manner by fastening the tubing mandrels end to end is not new. However, according to the method customarily used the mandrel is dipped into a coagulant solution and then into the latex and in each dip a coating considerably thicker than 1/100 of an inch thick has been deposited. Tubing 1/16 of an inch thick has been formed by dipping the mandrel into the latex no more than two or three times.

The process and the apparatus of the present invention are entirely different from the prior art and a chief difference lies in the fact that heretofore when tubing has been made by dipping a continuous mandrel or a plurality of short mandrels fastened end to end, the process has been carried out as a straight line process whereas as in my preferred process this is not the case and in my preferred method the path of the mandrel in the dipping process and also in the vulcanization process is pseudo helicoidal as explained below, and in each cycle of the dipping process a coating of rubber no more than 1/200 of an inch thick is deposited on the mandrel, and the equipment employed is most compact.

The equipment employed according to this invention is compact and provides for dipping the the tubing mandrel lengthwise into the latex bath a large number of times so that altho in each single dipping operation a layer of rubber no thicker than 1/200 of an inch is formed, by dipping at least ten times a rubber article of suitable thickness, 1/20 of an inch for example, is produced, and in the preferred equipment means is provided for dipping the mandrel thirty or forty or more times in the same bath. Any desired wall thickness is obtained by dipping the mandrel in the latex any required number of times. The equipment and method is advantageously used in the manufacture of tubing having very thin walls, such as, for instance "Penrose" or drainage tubing, the walls being approximately .006 to .010 inch in thickness.

The dipping and vulcanization equipment are preferably set up adjacent to one another so that the tubing formed by dipping may be passed directly through the vulcanizing equipment as a continuous process and without any intermediate handling.

The vulcanization equipment may be that previously employed. However, I prefer to employ a new design of equipment which utilizes the principle on which the dipping equipment is based. The vulcanization process and apparatus of the invention may be used for the vulcanization of rubber tubing, hose, etc., however formed, provided the product has, during the whole period of vulcanization, the necessary degree of elasticity to compensate for the commercial variations in the dimensions of parts of the apparatus as described more fully hereinafter. This elasticity during vulcanization may be secured by proper compounding or it may be provided mechanically as in the case of latex tubing, for example, by using a vulcanized rubber base or insert. I prefer to employ a single hot vulcanization bath of water or an aqueous solution and keep the mandrel submerged in the bath thruout the vulcanization process. The preferred equipment consists generally of two series of sheaves, preferably one above the other and I prefer to pass the mandrel over the sheaves in a pseudo-heliocoidal path.

Latex dipping baths of various concentrations may be used in forming the tubing. A thicker bath will form a thicker deposit each time the mandrel is dipped into the bath and a thinner bath will form a thinner deposit. Since the time of drying of the deposit is not a linear function of the thickness of the deposit but increases rapidly with any increase in the thickness of the deposit, it is not always advantageous to use the highest concentration possible. For most operations a concentration which will require between about 30 and 50 dips for building up a layer of rubber 1/16 of an inch thick will ordinarily be preferred. A preferred concentration used in the following examples contains about 50% of solid material and in the neighborhood of 40 dips are required to build up a rubber deposit 1/16 of an inch thick. The latex is preferably compounded with sulphur and usually also an accelerator, etc. to hasten the vulcanization of the latex although of course uncompounded latex may be employed and the latex may thereafter be cured by sulphur chloride or by other migratory vulcanizing agents.

Because of the large number of dips employed in the present process and the consequent thinness of the deposit formed by each dip, it is possible, if the latex is reasonably transparent to place some mark or design on the deposited rubber near the end of the dipping process and then cover this mark with a thin layer of rubber. Tubing, etc., printed with a trade mark just prior to entering the bath for the last dip will be covered with a layer of rubber no thicker than $\frac{1}{200}$ of an inch and the mark will therefore be permanent whereas, if the trade mark is printed after the dipping operation has been completed, as is customary at the present time, it may soon wear off or be effaced. This trade mark may be a design or it may merely be a colored mark and in the case of tubing or other continuous products it may merely comprise one or more stripes which may be of varying width and of the same or different colors, running the length of the tubing. The mark need not be a continuous stripe but may be applied only at intervals as separated dots or dashes. In a similar way the name of the manufacturer or directions for use, etc. may be permanently built into the article.

The tubing or other product need not be homogeneous throughout. For example, in the manufacture of tubing to be used for conveying gasoline, the inner wall of the tube may be made from a synthetic latex which yields a product resistant to the gasoline. For instance, Neoprene latex may be used. The tubing mandrel may, for example, be dipped ten times into the Neoprene latex and then thirty times into the usual rubber latex. The mandrel passes first through one bath and then through the other bath and then preferably also through the vulcanization equipment as one continuous process without interruption.

The invention will be further described in connection with the accompanying drawing in which the equipment is illustrated more or less diagrammatically.

Fig. 1 shows in elevation a preferred form of the dipping tank and equipment;

Fig. 2 shows in elevation a preferred form of vulcanization tank;

Fig. 3 is an end view of Figs. 1 and 2 with the tubing mandrel of Fig. 1 passing to and through the vulcanization tank of Fig. 2;

Fig. 4 is an enlarged detail showing a preferred type of bearing for use in the latex bath;

Figs. 5-7 show modifications of the dipping equipment;

Fig. 8 shows means for continuous dipping in two different latex baths;

Figs. 9-12 show modifications of the vulcanizing equipment.

Referring now to the drawings, Fig. 1 shows equipment for the continuous production of tubing and a continuous mandrel composed of shorter mandrels suitably connected. The flexible, elastic mandrel 1 is threaded over two series of pulleys or sheaves $A_1, A_2, A_3 \ldots A_x$ and $B_1, B_2, B_3 \ldots B_x$. The number of pulleys in each series will depend upon the concentration of latex employed and will also depend upon the thickness of the deposit which is to be formed. There may be ten pulleys in each series or as many as thirty or forty or fifty or more. The pulleys $B_1$, etc. are fixedly mounted on the shaft 2. The pulleys and shaft are submerged in the bath of compounded latex 3 in the tank 4.

As latex tends to deposit and build up where friction occurs between surfaces submerged in the latex, suitable means must be devised for holding the shaft 2 in the latex bath with the least bearing surface possible. Fig. 1 shows the shaft retained in the uprights 5. Latex is supplied to the bath through the pipe 6. Fig. 4 shows an enlarged detail of the means for holding the shaft in the iron uprights 5. Each upright is beveled around the hole through which the shaft 2 passes so that the shaft contacts only a sharp edge of the upright, as shown.

It may readily be seen that the weight of the shaft 2 with its series of sheaves or pulleys serves to maintain a longitudinal tension on the flexible base or mandrel. It is preferable that these elements be of such weight and density that the shaft 2 passes against the uprights 5, either up or down, only lightly.

The pulleys $A_1$, etc. are fixedly mounted on the shaft 7 which is driven by a chain (not shown) which passes over the sprocket 8. The shaft 7 is supported from the ceiling by the hangers, 9.

After leaving the dipping equipment shown in Fig. 1 the mandrel passes to the vulcanizing equipment shown in Fig. 2. Fig. 3 shows an end view of both the dipping equipment and the vulcanizing equipment and the coated mandrel passing from one to the other.

The vulcanizing equipment similarly comprises two series of pulleys $D_1, D_2, D_3 \ldots D_x$ and $E_1, E_2, E_3 \ldots E_x$. These are supported by the shafts 11 and 12 which are mounted in the frame 13 which may be raised and lowered into and out of the tank 14 which is filled to the line 15 with the vulcanizing bath. The shaft 11 is preferably equipped with a sprocket which is driven at the same speed as the sprocket 8 shown in Fig. 1 and the pulleys $D_1$, etc. have the same diameter as has pulley $A_x$. In this case the pulleys $D_1$, etc. may be fixedly mounted on the shaft 12 or they may be movably mounted thereon. The mandrel is extensible and under tension so there is no slippage between the mandrel and pulleys in this preferred arrangement. The number of pulleys will depend upon the distance between the shafts 11 and 12, the speed of travel and the length of time which it is desired to keep the mandrel in the vulcanizing liquid.

It is desirable to pull the mandrel thru some sort of tensioning device as it enters the dipping tank and it is preferably drawn from the vulcanizing tank under tension and maintained under tension thruout the dipping and vulcanizing processes. The tensioning device thru which the mandrel passes before entering the dipping tank may, for example, comprise the weighted pulley 17 which cooperates with the roll 18 by spring means (not shown) so that there is no slippage of the mandrel between them. The mandrel on entering the tank must be pulled with sufficient force to overcome the pull of the weight W. Any suitable means for maintaining the mandrel under tension throughout the dipping and vulcanizing operations may be employed.

The mandrel may be composed of a series of short mandrels about 50 feet long which is the usual length, or longer or shorter mandrels may be employed. The mandrels are united end to end by any usual means. They are coupled together before entering the dipping bath and after vulcanization they are separated and at the union between each two lengths the deposited latex coating is cut to sever the tubings into the desired lengths and the tubings are removed from the mandrels in any usual way as by blowing with air.

The number of sheaves, $A_1$, $A_2$, $A_3$, etc., and $B_1$, $B_2$, $B_3$, etc., depends upon the number of individual dips required to build up the desired thickness of tubing. Ordinarily for tubing having a wall thickness of $\frac{1}{16}''$, the use of approximately 40 pairs of sheaves seems advisable, though the number selected is governed by the solid content and viscosity of the latex compound used, as well as by the drying conditions and the speed at which the apparatus is run. By increasing the thickness of the deposit and suitably decreasing the speed, thus allowing more drying time, it is possible to reduce the sheaves to a very small number. It is thus obvious that the number of sheaves may be varied within wide limits. When the proper thickness has been reached, as at $A_x$, the coated mandrel is led from the apparatus. Sheaves 5 inches in diameter and ¾ inch thick, and with centers 1 inch apart on shafts placed 4 feet or more apart have been found satisfactory for tubing $\frac{1}{16}$ to ½ inch in diameter. A tank 8 inches wide, 8 inches deep, and 4 feet long will be suitable for an operation requiring 40 dips. The mandrel may be passed thru such a tank at the rate of 2 feet per minute.

As previously indicated, it is necessary that shaft 2 be wholly submerged under the surface of the latex; and it is preferable that sheaves $B_1$–$B_x$ be wholly submerged. It is absolutely essential to the success of the process that the coated mandrel should touch no solid object from the time it emerges from the liquid until the surface of the coat or film has "set" sufficiently to resist damage from such contact. Hence it is clear that if $B_1$–$B_x$ are not submerged in toto, they must be sufficiently covered by liquid that they have no contact with the mandrel at its points of emergence.

The sheaves in the series $A_1$–$A_x$ serve as guides and supports for the mandrel. The individual sheaves of the series also serve to apply powder to the mandrel in each cycle of its travel. Likewise the sheaves in series $B_1$–$B_x$ serve as guides for the mandrel. Also they cooperate with sheaves $A_1$–$A_x$ to maintain the tension which is necessary for governing the angle at which the mandrel emerges from the liquid, as well as for other reasons later explained herein. In the manufacture of ordinary tubing by this method it is very important that the mandrel rise perpendicularly from the liquid as otherwise the tubing would vary in wall thickness around its circumference. The effect of even a slight inclination from the perpendicular is marked.

A drying chamber 20 (Figs. 1 and 3) of any desired type, may be placed at any position in the path between the points of emergence and the following submergence. It may be simply a heated chamber, or it may be supplied with a device for circulating the air. If desired, vapors of acetic acid or other coagulating materials may be introduced to hasten the "setting" of the film.

If warm air is used to set the film it may be desirable to use a dryer covering practically the whole travel of the mandrel outside the liquid. If the rubber deposited in one dip is not well dried before the next dip the moisture content builds up and this is to be prevented.

In Figures 1 and 3, $C_1$, $C_2$, $C_3$ ... $C_x$ represent midpoints on lines joining the centers of sheaves $A_1$ and $B_1$, $A_2$ and $B_2$, etc., and hence are mean centers of each cycle. From the description it may readily be seen that by the method of this invention, the mandrel, while continuously moving longitudinally, progresses laterally through the apparatus, the significant or mean direction of travel being from $C_1$ toward $C_2$, etc. i. e., along the mean axis.

The complete path of travel probably more nearly resembles a helix than any other common mathematical figure, yet it varies from a true helix in many particulars. In a helix, all points on the periphery are at the same distance from the axis, which is not true in this case. In a helix, the pitch is constant whereas in this case the path of travel follows, while on the sheaves, arcs lying on the parallel planes of rotation of the sheaves; the transverse travel occurs only while the mandrel is following substantially straight lines between the sheaves; nevertheless in each case, travel around the periphery is accompanied by an advance in a direction parallel to the mean axis, and consequently in this specification and appended claims I shall refer to the complete line of travel as pseudo-helicoidal.

It is essential to the process that the mandrel or base 1 be made of such materials that it have a considerable degree of elasticity. This requirement may be easily understood when it is considered that as it progresses from $A_1$ toward $A_x$ it gradually increases in diameter, and since this is equivalent to an increase in the effective diameter of the sheaves, its rate of travel tends to be correspondingly increased. If metallic wire were used for the base or mandrel, it is obvious that slippage would occur, or the film would be damaged by excessive pressure, or the mandrel would be ruptured. Due both to the unstable nature of the liquid latex itself and the delicate nature of the unvulcanized surface of the dried latex coating, it is absolutely necessary that no slippage occur either over the sheaves $A_1$–$A_x$ or $B_1$–$B_x$.

In actual practice I have offset in some degree the effect of the gradually increasing radius of the mandrel, by gradually decreasing the radius of the sheaves from $A_1$ toward $A_x$ and $B_1$ toward $B_x$, to correspond to the increase of the mandrel size. Thus if the film on the mandrel builds up in thickness at the rate of .003 inch per individual dip, the radius of each succeeding sheave in the upper and lower tiers should be .003 inch less than that of the sheave in the same tier immediately preceding it. At each sheave the sum of the radii of the sheave and the coated mandrel is as nearly constant as is commercially feasible. It should be clearly understood, however, that this graduation of the radii of the sheaves is not in itself sufficient to obviate the difficulty. If the mandrel is inextensible, the variations are cumulative in effect. If the sum of the radii of the sheave and mandrel at any given point varies from the ideal by only .0005 inch (and this degree of accuracy is far from attainable) an inextensible mandrel would operate only a few hours before rupture or before ruining the product.

In order to operate by this method, it is necessary to use an elastic mandrel. Also, it is preferable that the tension device 17, 18 be so adjusted that the mandrel be caused to stretch sufficiently to enable it to absorb the effects of the unavoidable variations in effective diameters of the sheaves without at any point gaining or losing any great proportion of the originally impressed stretch. It may be seen that this original stretch and also the amount or degree of elasticity of the mandrel may vary widely, being dependent largely on the variation allowed in the effective diameters of the sheaves.

Ordinarily, for the manufacture of tubing I have found mandrels made of rather heavily compounded vulcanized rubber to be perfectly satisfactory. For some purposes the amount of elasticity ordinarily associated with a cabled cotton cord is sufficient and such textile material may in these cases be used as the base, either alone or in combination with other materials.

If long continuous sections of mandrel are not necessary, the increased tension may be dissipated by means of elastic sections of materials such as rubber joined end to end between the lengths of a less extensible or inextensible mandrel. By use of this device the necessity of graduation in diameter of the sheaves is avoided.

The apparatus for carrying out the process of the invention may be varied greatly in details. The singly grooved sheaves fixedly mounted on shafts may be replaced by multiple grooved sheaves, or the whole shaft and sheaves assembly may be replaced by a grooved roll. In Figure 5 is shown a variation in which the mandrel is advanced by being passed between cooperating rolls 21. Individual rolls may act on each individual stretch of the mandrel or each of the rolls may be as long as the shafts bearing the sheaves and act on each descending stretch of the mandrel. In each cycle driving power is applied to the mandrel through one or both of these rolls while sheaves $A_1-A_x$ and $B_1-B_x$ are idle and preferably not fixed to their carrying shafts. In order to minimize the difficulties arising from variation in effective sheave diameter, it is preferable that one or both of these rolls be faced with some yielding material such as rubber sponge.

It will be noted that in all the types of apparatus as shown in the drawings, the power for driving is applied to the mandrel in each cycle. If an inextensible mandrel were practicable, this would be unnecessary and the whole apparatus for dipping and vulcanizing could be driven by application of power at one point, as for example, at $D_x$. With an elastic mandrel, however, such an arrangement would cause the apparatus to run irregularly. The minimum frequency of application which is feasible depends upon the resistance to stretch offered by the mandrel and the friction of the various bearings of the apparatus. With a one-half inch diameter mandrel, one power application in each five cycles would perhaps be sufficient, whereas with mandrel $\frac{1}{16}''$ in diameter, power application in each cycle would be absolutely necessary. Experience has shown the latter arrangement to be preferable in all cases.

Figure 6 represents another modification, in which the sheaves $A_1-A_x$ are replaced by a driven roll which makes contact with the mandrel in each cycle, the roll 24 being preferably faced with a yielding material such as rubber sponge. In this case, also, it is preferable that sheaves $B_1-B_x$ revolve independently of each other.

Figure 7 represents yet another modification similar to that shown in Figures 1 and 2 except that it is adapted to produce rubber gasket material or the like characterized by having a heavier deposit on one side than on the other. In this modification the mandrel 1 leaves the liquid at an angle other than perpendicular.

In the manufacture of ordinary latex tubing, it is convenient to use mandrels approximately 50 feet in length, the separate sections being fastened together by any means easily available, although longer or shorter lengths may be used. The method is very useful for making gas mask tubing. For this production the short lengths of rubber mandrel having the desired shape are secured together end to end and passed through the latex compound successively as described above. After vulcanization the mandrels are separated and the gas mask tubing is removed.

Products having cross sections other than circular may be made on appropriate bases. For example, stock to be cut into latex bands may be formed on flat mandrels, and products of a different shape may be formed on an appropriately shaped mandrel. The process may be used equally well for the manufacture of articles in which the base is not removed but remains a part of the article.

The dipping tank of Fig. 8 is divided into two sections, 25 and 26. Each contains a latex of different material or a latex of the same material differently compounded. For example, for the manufacture of a tubing for the transportation of gasoline the mandrel may first enter the dipping bath 25 which contains a neoprene latex and then after any required number of dips to build up a neoprene deposit of suitable thickness the mandrel enters the bath 26 where rubber latex is deposited over the neoprene. This gives a tubing which has a neoprene center and an outer covering of rubber. The number of dips of neoprene and rubber latex may be varied to give a tubing of desired composition. Any latex may be substituted for the neoprene and any latex may be substituted for the rubber to give any desired combination for any purpose. By using baths of the same latex composition but differently colored, a tubing with a cross section of different colors may be formed for trade-mark purposes. This is particularly useful if the tubing is to be cut into short lengths to serve as rubber bands.

Figure 8 shows means for applying a trademark to the tubing before the dipping is completed. The wheel 30 which bears a suitable design or mark and which is supplied with ink (by means not shown), prints on the dried latex before the last dip. It may be located several sheaves ahead of the sheave $F_x$. The mark is covered with a thin layer of rubber on the subsequent dip or dips but the rubber coating is so thin that the mark is clearly visible thru it. This process is of course not suitable for use with latex so compounded as to be opaque.

The construction of the vulcanizing apparatus shown in Fig. 2 is such that this apparatus operates on substantially the same principle as the dipping apparatus. The material being vulcanized travels through the apparatus in a pseudo-helicoidal path. As an alternative arrangement instead of having the shaft 11 directly above the shaft 12 in the vulcanizing equipment the two shafts 11 and 12 may lie in substantially the same horizontal plane, altho the arrangement shown in Figs. 2 and 3 is preferred. In a still further alternative arrangement the shafts are vertical so that the mandrel in passing between the sheaves travels in a vertical pseudo-helicoidal path.

The vulcanizing bath may be water or other aqueous solution heated to a suitable vulcanizing temperature. Since the rubber deposit is dried or otherwise set before it enters the vulcanizing bath the path of the mandrel through this bath may be varied quite considerably. It is not necessary to keep it from coming in contact with any equipment at any stage of the cycle. The equipment therefore may be quite different from that employed for dipping where it is essential that the coated mandrel shall not touch anything after it leaves the dipping bath in each cycle until it has dried or set. However the preferred design of vulcanization equipment carries the mandrel thru the pseudo-helicoidal path described in connection with the dipping process.

As shown in Fig. 9 the mandrel may be crossed in passing from the upper sheaves to the lower sheaves and returning again to the upper sheaves. If the sheaves are arranged in a substantially horizontal plane then it may be desirable to support the mandrel as it passes from the one set of sheaves to the other. This may be done by the use of supporting rolls such as those indicated by the numeral 31 in Fig. 10. Instead of two series of sheaves three series may be used as shown in Fig. 12 or four or more series may be used as shown in Fig. 13.

The size of the vulcanizing bath will depend upon the time required for vulcanization and the speed of travel of the mandrel. For example, if one hour's vulcanization is required and the mandrel is traveling at a speed of 2 feet per minute, the vulcanizing bath must accommodate 120 feet of the mandrel.

Instead of using a vulcanizing bath a vulcanizing chamber filled with steam or hot air may be used. In this case the mandrel may be passed through the vulcanizing chamber in any of the ways described for passing the mandrel through the vulcanizing bath.

Extruded rubber cord or tubing or rubber having cross sections of other shapes may be vulcanized on an elastic mandrel in a similar way in this apparatus.

Although throughout the specification I have used the word "latex" to refer more particularly to the compounded latex of the rubber tree such as the latex of the tree *Hevea Brasiliensis* it is to be understood that the invention is not limited thereto but is applicable to the building up of rubber articles from any aqueous suspension of rubber or reclaimed rubber or a synthetic, or natural rubber-like material and the claims are to be understood accordingly.

I claim:

1. Apparatus for the formation of rubber articles which comprises a first tank adapted to hold latex, a second tank adapted to hold a vulcanizing bath, submerged in each tank a shaft with a plurality of sheaves thereon, above each of said shafts another shaft with a plurality of sheaves thereon, a flexible, elastic mandrel passing progressively over the upper and lower sheaves associated with each tank from one end of each tank to the other, and from the first tank to the second tank and means for maintaining the mandrel under tension thruout.

2. Apparatus for the manufacture of latex tubing which comprises in combination with a tank adapted to hold liquid latex, a shaft disposed horizontally below the liquid level in the tank, on the shaft means having on the periphery a plurality of grooves, said grooves being concentric with the shaft, a shaft above and parallel to the aforementioned shaft and having thereon means provided on the periphery with grooves concentric with the upper shaft, and a flexible, elastic mandrel pseudo-helicoidally surrounding said shafts and passing progressively in the two sets of grooves from one end of the shafts to the other.

3. Apparatus as in claim 2 adapted for latex tubing manufacture, characterized by the fact that the distances from the bottoms of the grooves to the shafts which support them diminish progressively along each shaft, from one end of the shaft to the other.

4. Apparatus for latex dipping which comprises in combination with a tank a long flexible elastic mandrel of small cross-sectional area, means for causing the mandrel to dip into and out of the tank in a pseudo-helicoidal path and tensioning means through which the mandrel passes as it first enters the tank.

5. Apparatus for applying successive latex coats which comprises in combination with a tank a long flexible elastic mandrel of small cross-sectional area, means for continuously advancing the mandrel and means for causing the mandrel to be continuously and successively submerged into and emerged from latex in the tank in such manner that the successive points of submergence are in a line substantially parallel to, but spaced from the line passing thru the successive points of emergence, both the points of submergence and the points of emergence being substantially fixed with relation to the sides of the tank.

6. Apparatus for applying successive latex coats to a mandrel which comprises in combination with a tank containing latex, a shaft below the level of the latex in the tank, a series of sheaves on the shaft and a long flexible elastic mandrel of small cross-sectional area threaded in and out of the latex in the tank and passing under each sheave in the order in which the sheaves are placed on the shaft and means for maintaining the mandrel in the tank under tension.

7. Apparatus for applying successive latex coats to a mandrel which comprises in combination with a tank for the latex a long, flexible, extensible mandrel of small cross-sectional area, means for submerging separate portions of the mandrel under the liquid level of the tank, means for maintaining intervening portions of the mandrel above the liquid level of the tank, means for advancing the mandrel thru the tank and means for maintaining all of said portions of the mandrel under longitudinal tension.

8. In the manufacture of rubber tubing, the process which comprises passing a long, flexible elastic mandrel of small cross-sectional area lengthwise into and out of a dipping tank of latex in a pseudo-helicoidal path, then passing the mandrel into and out of a tank of vulcanizing liquid in a pseudo-helicoidal path, and maintaining the mandrel in a stretched condition thruout.

9. In the manufacture of rubber tubing on a flexible, elastic mandrel, the process of depositing latex on the mandrel by moving the mandrel lengthwise in and out of a latex bath in a pseudo-heliocoidal path while maintaining the mandrel in a stretched condition.

10. The method of forming a rubber article which comprises progressively passing a long elastic mandrel of small cross-sectional area, lengthwise, in a stretched condition, into and out of a latex bath, making each successive point of submergence into the bath closer to the last previous point of submergence than to the last previous point of emergence and in each dipping operation increasing the thickness of the rubber deposited thereon by a layer of rubber which when set is no thicker than 1/200 of an inch and setting the rubber between each latex dipping operation.

11. The process of forming a rubber article which comprises longitudinally passing an elastic mandrel coated with rubber deposited from latex, and substantially free from coagulating agent, around a sheave immersed in a latex bath and removing the mandrel from the bath thereby adding to it a coating of rubber deposited from the latex, which coating when set is no more than about 1/200 of an inch thick, setting the deposit of rubber on the mandrel while the mandrel is out of the bath before it comes in contact with any object, then passing the mandrel over a support to change its direction of travel and passing it under a sheave lying in a plane parallel to said first mentioned sheave and repeating the operation and maintaining the mandrel in a stretched condition throughout.

12. The method of producing a rubber article which comprises moving a long stretched elastic mandrel of small cross-sectional area lengthwise in a path comprised of a series of cycles, in each cycle dipping the mandrel into latex and removing it from the latex and then setting the latex thus deposited on it, the paths of the mandrel in the various cycles being substantially parallel and close to one another but spaced a sufficient distance to prevent the rubber covering on the mandrel coming in contact in any two adjacent cycles.

13. The method of forming a deposit of rubber from latex on a long, flexible, elastic mandrel of small cross-sectional area which comprises advancing the mandrel lengthwise, in a stretched condition, in a series of cycles each of which comprises dipping the mandrel in the same latex bath without setting the latex on the mandrel to any substantial extent while it is in the bath and setting the latex after each dipping operation.

14. The method of forming a deposit of rubber from latex on a long, flexible elastic mandrel of small cross-sectional area which comprises maintaining continuously changing portions of the mandrel submerged in a latex bath and maintaining intervening portions out of contact with the latex bath, while advancing the mandrel lengthwise thru the bath in a stretched condition, lines joining the points of submergence and the successive points of emergence being substantially parallel and spaced from one another.

15. The process of making tubing on a long flexible elastic mandrel of small cross-sectional area which comprises repeatedly dipping the mandrel lengthwise into a latex bath while stretching it, and in each dip passing the mandrel under submerging means, the successive points of submergence and of the mandrel lying in substantially straight parallel lines which are substantially parallel to the mean direction of travel of the mandrel thru the bath.

16. The process of building up a latex deposit on a long, flexible, elastic mandrel of small cross-sectional area which comprises maintaining continuously changing portions of the mandrel submerged in a latex bath and maintaining the intervening portions of the mandrel out of the bath while advancing the mandrel thru the bath and applying driving power to the mandrel at frequent intervals thruout that part of its length which is involved in the dipping process to maintain all portions of said part in a stretched condition.

17. The method of forming latex tubing by dipping a form in latex which comprises repeatedly dipping the form in a latex bath and setting the latex deposited on the form following each dipping step, while advancing the form thru the latex bath, in each dipping step forming a deposit of rubber no more than 1/200 of an inch thick, and before the final dipping step placing a mark on the deposit of rubber, and then covering the mark with a transparent or translucent layer of rubber by dipping the marked deposit in the latex bath.

18. The process of preparing tubing on an elastic mandrel which comprises dipping the mandrel lengthwise a plurality of times in one latex bath and then dipping the mandrel lengthwise a plurality of times in a bath of a different latex, setting the deposit between each dipping operation and maintaining the mandrel in a stretched condition throughout the process.

19. The method of forming a deposit of rubber on a long flexible mandrel of small cross-sectional area which comprises repeatedly passing the mandrel longitudinally into and out of a latex bath and after each such dipping operation heating the latex thereby deposited on the mandrel before it again enters the bath, whereby in each such cycle a coating of latex is formed which when set is no more than about 1/200 of an inch thick.

20. The process of making tubing which comprises repeatedly dipping a long, flexible, non-metallic mandrel of small cross-sectional area lengthwise into a latex bath, and in each dip passing the mandrel under submerging means and adding to the mandrel in each dip a coating of latex which when set is no more than about 1/200 of an inch thick.

MARION M. HARRISON.

CERTIFICATE OF CORRECTION.

Patent No. 2,327,638. August 24, 1943.

MARION M. HARRISON.

It is hereby certified that error appears in the printed specification of the above numbered patent requiring correction as follows: Page 1, first column, line 45, strike out "the" before "tubing"; page 2, first column, line 45, for the word "drawing" read --drawings--; page 3, first column, line 46, for "powder" read --power--; page 6, second column, line 7, claim 15, after "and" insert --emergence--; line 40, claim 18, for "between" read --after--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.